Sept. 21, 1943.  J. T. PHIPPS  2,329,939
WELL TOOL
Filed April 15, 1940
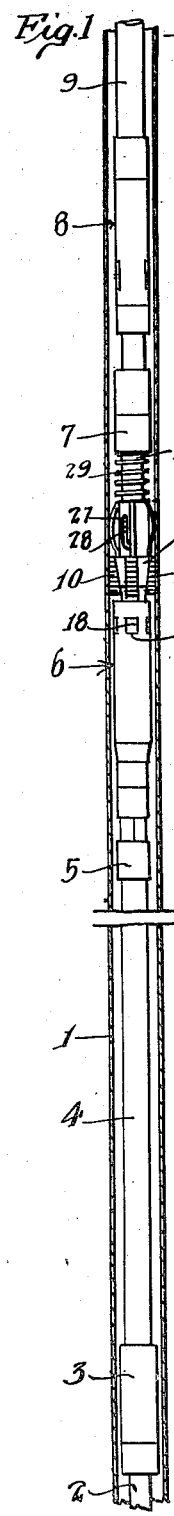
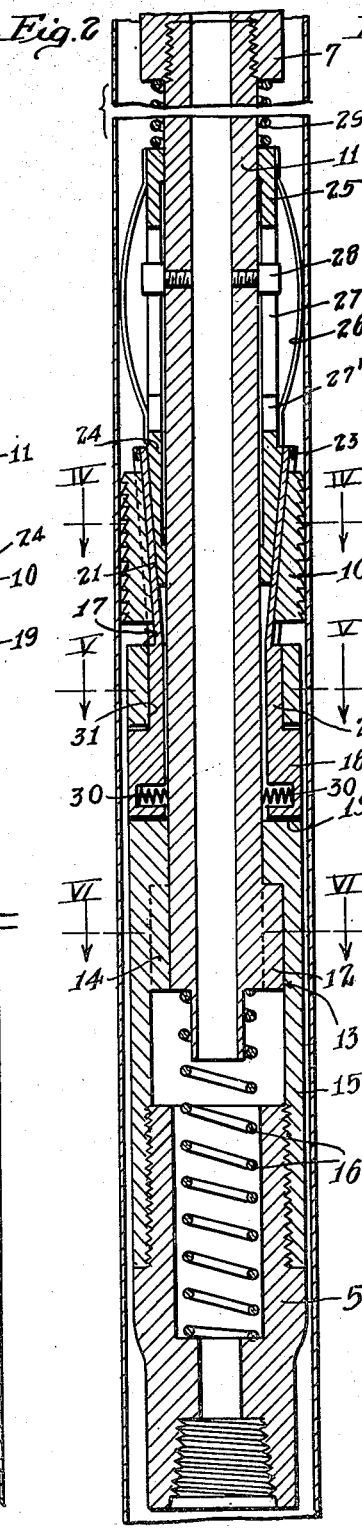
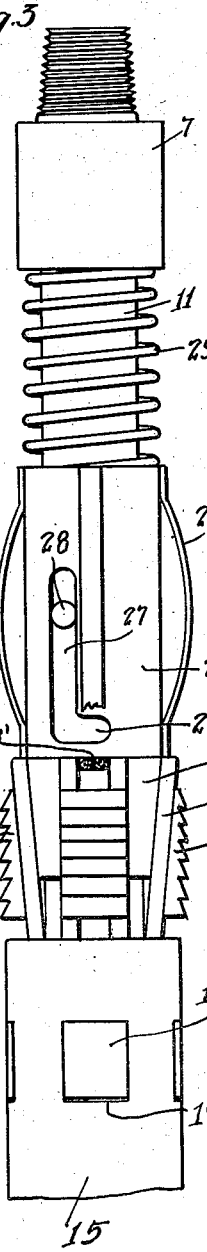
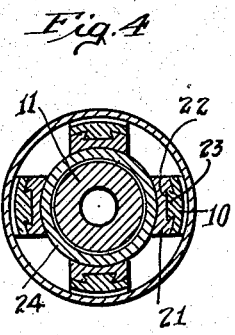
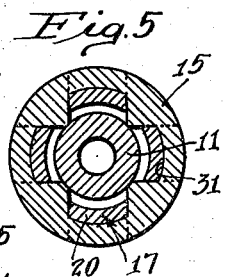
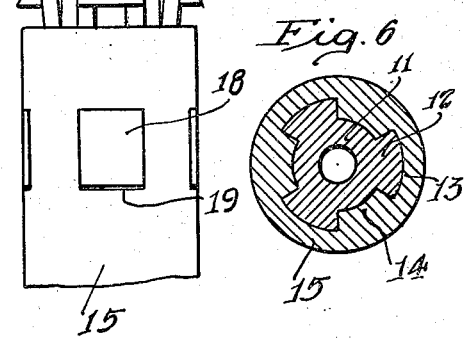
Inventor
John T. Phipps
By Lyon & Lyon
Attorneys Patented Sept. 21, 1943

2,329,939

UNITED STATES PATENT OFFICE 2,329,939

WELL TOOL

John T. Phipps, Huntington Park, Calif.

Application April 15, 1940, Serial No. 329,702

6 Claims. (Cl. 166—1)

This invention relates to anchoring devices for engaging a well casing and holding tools associated with the device, and is particularly useful in connection with fishing operations, although some features of the invention have numerous other applications.

A broad object of the invention is to facilitate fishing operations in a well, particularly by preventing return movement of a fish between successive lifting blows applied to the fish by means of a jar.

Another object of the invention is to provide a practicable anchoring device for insertion in a string between a fishing tool and a jar positioned thereabove, for preventing retraction of the fish and fishing tool between blows of the jar, while permitting free upward movement of the fishing tool and fish.

A more specific object is to provide an anchoring device as specified in the preceding paragraphs that can be readily rendered active or inactive from the top of the wall.

Another object is to provide an effective slip mechanism for general use in various different well tools, such as spears, anchors, catchers and the like.

Other more specific objects and features of the invention will become apparent from the following particular description of a particular embodiment thereof as illustrated in the drawing.

Briefly, the invention consists of a tool adapted to be inserted between a fishing tool and a jar thereabove, and having slips that can be selectively released or locked. The slips, when released, engage with the casing and prevent any downward movement of the tool itself or the fishing tool connected thereto, while at the same time offering no resistance to upward movement with respect to the casing.

In operation, the device functions to maintain a constant lift on the fish between blows of the jar, particularly during the momentary release of the jar immediately prior to striking the blow, and retains any upward movement of the fish resulting from the jarring action. In other words, the tool eliminates any possibility of the fish settling back between blows of the jar.

The need for a tool of this type has been recognized for a long time, but to the best of my knowledge no structure has ever heretofore been suggested that would satisfy the existing conditions. Thus an essential requirement of such a tool is that it must have a control mechanism for selectively locking or releasing the slips at any time by predetermined movements of the drill string from the surface.

The structure in accordance with the present invention satisfies this requirement, while at the same time being extremely simple, rugged and reliable.

In the drawing:

Figure 1 is an elevational view showing a device in accordance with the invention positioned in a tool string between a jar and a fishing socket, in a well casing;

Fig. 2 is a vertical sectional view through the major portion of a tool, in accordance with the invention;

Fig. 3 is an elevational view of the upper part of the tool; and

Figs. 4, 5 and 6 are cross sections taken in the planes IV—IV, V—V and VI—VI, respectively, of Fig. 2.

Referring first to Fig. 1, there is disclosed a cased well having a casing 1 and a fish 2 stuck in the bottom thereof, the fish being a length of tubing. The fish 2 is shown engaged by a fishing socket 3 which may be any one of many well-known types, since its particular construction is not material in connection with the present invention.

The fishing socket 3 is connected by a section of drill string 4 which may be several hundred feet in length, to a lower end member 5 of the tool 6 of the present invention. An upper end member 7 of the tool 6 is secured by the usual tool joint to the lower end of a jar 8 which may be any one of the many well-known types. The upper end of the jar is in turn secured to the lower end of a string of tubing 9 extending to the surface.

In the setup disclosed in Fig. 1, after the fish 2 has been engaged by the fishing socket 3, the tubing string 9 is successively lifted to trip the jar 8, causing the latter to apply lifting blows through the tool 6 and the tubing 4 to the fishing socket 3. The result of these blows, when the operation is successful, is to lift the fish a certain distance in response to each upward blow delivered by the jar. Unfortunately, however, in order to repeatedly actuate most jars, the tension on the tool string above the jar must be relaxed following each blow of the jar, to reset the jar. Furthermore, at the moment of release of the jar, all tension on the fish is momentarily released. This permits the fish to settle back down in the hole following each blow, in many instances greatly prolonging the time required to remove the fish, and occasionally preventing its removal.

However, the special tool 6, in accordance with the present invention, is provided with slips 10 which can be caused to engage the casing 1 and anchor the tool against downward movement, while permitting free upward movement. Therefore each time the fish is lifted in response to a blow of the jar, the tool 6 lifts also and its slips 10 then re-engage the casing to prevent retraction of the fish when the tension on the string 9 is relieved to reset the jar. In this way all lift obtained on the fish is retained and its removal greatly facilitated.

As shown in Fig. 1, a length of tubing 4 is inserted between the holding tool 6 and the fishing tool 3. This is not essential, but it is sometimes desirable for the reason that a section of tubing several hundred feet in length has sufficient elasticity to maintain a constant pull on the fish from the holding tool 6 which facilitates the movement of the fish when the jarring blow is applied.

The detail construction of the holding tool 6 will now be described with reference to Figs. 2, 3, 4, 5 and 6. The upper end member 7 is secured to the upper end of a mandrel 11 which extends downwardly for a substantial distance and has at its lower end a plurality of downwardly extending lands or ridges 12 which are slidable in grooves 13 between lands 14 in a main sleeve 15, which is secured at its lower end to the lower end member 5. The lands 12 and 14 are relatively short and the main sleeve 15 has a cylindrical inner surface below the lands 14 so that if the mandrel is lowered to carry the lands 12 thereon out of engagement with the lands 14 in the sleeve, the mandrel is freely rotatable with respect to the sleeve.

The mandrel is constantly urged into uppermost position with respect to the main sleeve by a helical compression spring 16 compressed between the lower end of the mandrel and the lower end member 5.

The main sleeve 15 is adapted to be supported from the well casing 1 by the slips 10. To this end, a plurality of slip reins 17 are engaged with the main sleeve 15 adjacent its upper end. In the particular design shown, four slips and four reins are provided. Each rein 17 has a block portion 18 at its lower end, which fits loosely within a window 19 in the main shell, the outer surface of the block portion 18 being approximately flush with the outer surface of the sleeve. Connected to the block portion 18 is a shank portion 20 which extends upwardly from the block in a groove provided therefor in the inner surface of the main sleeve to a point substantially level with the upper end of the sleeve. Thereabove the shank 20 merges into a slip seat portion 21 which extends upwardly and outwardly at a slight angle.

Referring to Fig. 4, each slip seat 21 is provided with a dovetail groove 22 therein which receives a dovetail tongue 23 on the associated slip 10 so that the slip is free to move longitudinally on the slip seat 21 but is restrained against lateral movement away from the seat.

To set the slips, a cone 24 is slidably mounted on the mandrel 11 above the main sleeve, this cone being adapted to bear against the rear surfaces of the slip seats 21, which constitute integral portions of the slip reins 17. The cone 24 is formed integral with a sleeve section 25 extending thereabove and loosely engaging the mandrel 11. The sleeve 25 is provided with the usual bow springs 26 for frictionally engaging the casing and also has a pair of diametrically opposite bayonet slots 27 cooperating with a pair of pins 28 on the mandrel. The sleeve 25 and cone 24 are constantly urged downwardly with respect to the mandrel, when not restrained by engagement of the pin 28 in the lower ends of the bayonet slot 27, by a helical compression spring 29 surrounding the upper end of the mandrel and compressed between the upper end of the sleeve 25 and the upper end member 7.

It is desirable that the slip seats 21 be urged inwardly at all times to prevent the slips from accidentally engaging the casing when engagement is not desired. To this end, helical compression springs 30 are mounted in recesses provided in the rear surfaces of the block portions 18 of the reins 17, these springs constantly urging the lower ends of the reins radially outwardly and causing them to fulcrum against the inside surfaces 31 of the main sleeve, thereby urging the slip seat portions 21 of the reins inward into engagement with the cone 24.

As shown in the drawing, the pins 28 are in the vertical portions of the bayonet slots 27 so that the spring 29 is effective to urge the cone 24 downwardly relative to the mandrel. Therefore the main sleeve 15 is supported against downward movement by the reins 17 which are wedged between the slips 10 and the cone 24. It should be noted that the upper end of the dovetail groove 23 in each rein is closed, as indicated at 23' in Fig. 2, so that if the frictional grip of the slips 10 and the cone 24 is insufficient to prevent downward movement of the slip seat 21, the end wall 23' will eventually positively engage the upper end of the slip, thereby positively preventing any further downward movement of the rein relative to the slip. Ordinarily the slip seat 21 is frictionally locked between the slips and the cones before the slips contact the end wall 23' of the slip seat.

I have found it advantageous to mount the slips 10 slidably on the slip rein, as disclosed, since it increases the downward wedging force on the slip, thereby making the bite of the slip into the casing more positive.

In the position shown in Fig. 2, the holding tool resists any downward movement of the main sleeve 15. Likewise ordinary downward forces applied to the mandrel 11 through the upper end member 7, are resisted by the springs 16 and 29, which function jointly under the conditions described to resist downward motion of the mandrel. However, if the lifting force applied to the mandrel (as by a blow delivered by the jar) exceeds the downward force, the whole device is free to move upwardly in the casing because the slips 10 are free to slide inwardly and downwardly along their seats 21. But when the upward movement terminates, and the device starts down again, the slips 10 immediately slide upwardly and outwardly along the seats 21 to grip the casing.

A most important feature of my construction is that it is possible to render the slips 10 inoperative to engage the casing at any time. Thus with the slips set as shown in Fig. 2, if the operator wishes to disengage the slips and prevent further engagement of them, he has merely to move the string 9 (Fig. 1) downwardly with sufficient force to compress the springs 29 and 16 and move the mandrel 11 downwardly with respect to the cone 24 and the main sleeve 15 until the pins 28 are in the lower ends of the slots 27, whereupon the string is rotated through a small angle to the left to engage the pins in the lateral recesses 27' (Fig. 3) of the bayonet slots after which the string 9 (Fig. 1) is again lifted to re-elevate the mandrel 11. During this upward movement, of course the pins 28 carry the cone 24 with them, maintaining the spring 29 compressed. The upward movement of the cone 24 releases the slips 10 from the casing and they drop inwardly and downwardly along the slip seats 23 until they are completely clear of the casing. Thereafter the tubing string may move either upwardly or downwardly through the casing without engaging the slips 10 because the cone 24 is locked in uppermost position by the pins 28 and the recesses 27'.

However, the slips may be rendered effective again at any time by merely rotating the tubing string and the mandrel 11 to the right to disengage the pins 28 from the recesses 27' of the bayonet slot. As soon as the pins enter the longitudinal sections of the slots, the spring 29 becomes effective to force the cone 24 down into position to wedge the slips 10 outwardly into engagement with the casing and restore the apparatus into the condition shown in Fig. 2.

As previously indicated, the spring 16 is relatively stiff and normally maintains the lands 12 and 14 on the mandrel and the main sleeve, respectively, in interengaging position, as shown in Fig. 2, in which position any rotation of the mandrel is transferred to the main sleeve 15 and thence through the lower end member 5. This permits manipulation of tools below the holding tool 6, which may require rotary movement.

On the other hand, by forcing the mandrel downwardly with respect to the main sleeve 15 against the force of spring 16, the lands 12 and 14 may be disengaged to permit rotation of the mandrel to engage or disengage the pins 28 in the bayonet recesses 27' even though the main sleeve 15 is locked against rotation either by the slips 10 or by something connected thereto from below.

Under some conditions, the lower spring 16 may be eliminated, but it may then be desirable to make the string 29 heavier.

While I have shown and described a preferred embodiment of the invention, it will be understood that various departues from the exact construction shown can be made without departing from the invention, which is to be limited only as set forth in the appended claims.

I claim:

1. A device of the type described, adapted to be inserted in a tool string in a cased well, comprising: upper and lower members adapted to be connected to upper and lower sections, respectively, of the tool string, means interconnecting said upper and lower members, slip means connected to said lower member for vertical movement therewith, and for radial movement with respect thereto, to engage the well casing and support said lower member from the casing, means movable to set and release said slip means, and means for moving said setting and releasing means in response to predetermined movements of said upper member relative to the casing, said setting and releasing means including a wedging member movable downwardly for setting said slip means, spring means for urging said wedging means downward with respect to said upper member, and means responsive to predetermined movement of said upper member for releasably locking said wedging member against movement by said spring means.

2. A device of the type described, adapted to be inserted in a tool string in a cased well, comprising: upper and lower members adapted to be connected to upper and lower sections, respectively, of the string, slip means connected to said lower member and engageable with the well casing to support said lower member on the casing, wedging means movable to set and release said slips, means for selectively locking said wedging means to said upper member for movement therewith, while at its upper limit of movement with respect to said upper member, means interconnecting said upper and lower members and providing limited lost motion therebetween, and spring means yieldably urging said lower member downward with respect to said upper member, whereby said upper member is movable, by yielding of said spring means, into said position to lock with said wedging member even when the latter is in its lower, slip-setting position with respect to said lower member.

3. A device as described in claim 2, with spring means yieldably urging said wedging member downward with respect to said upper member.

4. A device as described in claim 2, with springs means urging said wedging member downward with respect to said upper member, and means on said wedging member for frictionally engaging the casing.

5. In a device of the type described, a body member movable in a casing, a rein for supporting said body member and extending upwardly and outwardly at an angle, a slip slidably mounted for longitudinal movement on said rein, and wedge means operable directly against said rein for indirectly urging said slip against the casing.

6. In a device of the type described, a mandrel, a sleeve on the mandrel having recesses therein, slip reins extending vertically between said mandrel and sleeve and extending outwardly into said recesses to interlock said reins and sleeve for vertical movement together, slip means associated with said reins, wedging means back of said slips, and spring means between said mandrel and the lower ends of said reins for yieldably deflecting the upper ends of the reins inwardly.

JOHN T. PHIPPS.